(12) United States Patent
Aikawa

(10) Patent No.: US 7,561,349 B2
(45) Date of Patent: Jul. 14, 2009

(54) TELESCOPE AND LENS CAP

(75) Inventor: Yasuyuki Aikawa, Kawasaki (JP)

(73) Assignees: Nikon Vision Co., Ltd., Tokyo (JP); Nikon Corporation, Tokyo (JP)

( * ) Notice: Subject to any disclaimer, the term of this patent is extended or adjusted under 35 U.S.C. 154(b) by 178 days.

(21) Appl. No.: 11/699,434

(22) Filed: Jan. 30, 2007

(65) Prior Publication Data
US 2007/0183061 A1 Aug. 9, 2007

(30) Foreign Application Priority Data
Feb. 8, 2006 (JP) ............................... 2006-031066

(51) Int. Cl.
*G02B 7/02* (2006.01)
(52) U.S. Cl. ..................... 359/811; 359/818
(58) Field of Classification Search ................ 359/811, 359/818, 819; 600/112, 121, 174, 131
See application file for complete search history.

(56) References Cited

U.S. PATENT DOCUMENTS

| 4,241,436 A | 12/1980 | Bolzt et al. |
| 4,600,278 A | 7/1986 | Saito |
| 4,641,932 A | 2/1987 | Harms |
| 5,854,583 A * | 12/1998 | Falchetti ..................... 337/290 |
| 6,157,482 A | 12/2000 | Koide |
| D443,628 S * | 6/2001 | Koshibe et al. ............ D16/132 |
| 6,247,855 B1 | 6/2001 | Motohashi et al. |
| 6,799,854 B1 | 10/2004 | Steiner |

FOREIGN PATENT DOCUMENTS

| JP | 5-83734 U | 11/1993 |
| JP | 10009868 A | 6/1996 |
| JP | 2000221410 A | 2/1999 |
| JP | 2000-147388 A | 5/2000 |
| JP | 2005-157130 * | 6/2005 |

OTHER PUBLICATIONS

British Search Report of the counterpart UK Patent Application No. GB 0701756.9 dated May 31, 2007.

* cited by examiner

*Primary Examiner*—Timothy J Thompson
(74) *Attorney, Agent, or Firm*—Miles & Stockbridge P.C.

(57) ABSTRACT

Providing a telescope capable of preventing aesthetic external appearance thereof from losing. The telescope has a hole 33 on an outer surface of a lens barrel 3. A lens cap 5 for protecting an objective lens of the telescope includes a lens cap body 51, an extending portion 59 extending from the lens cap body 51, and connecting member 52 capable of removably attaching to the hole 33.

10 Claims, 8 Drawing Sheets

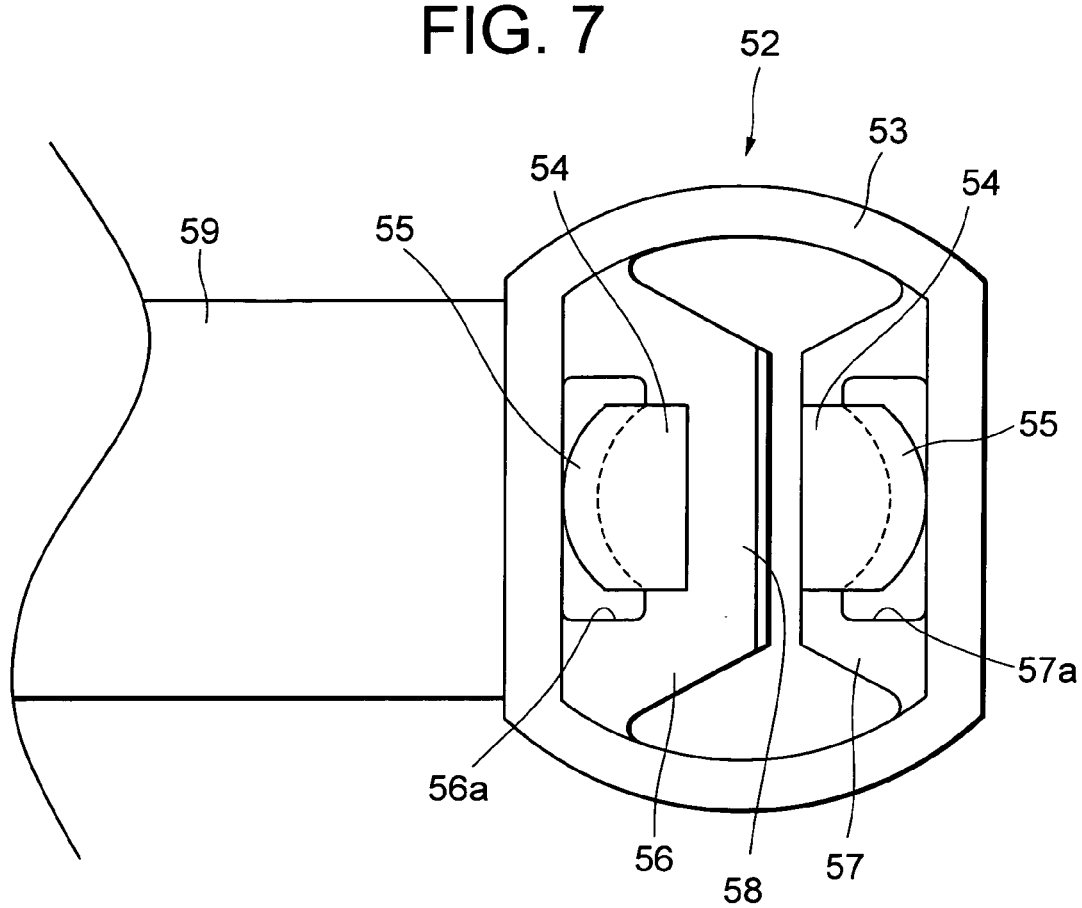
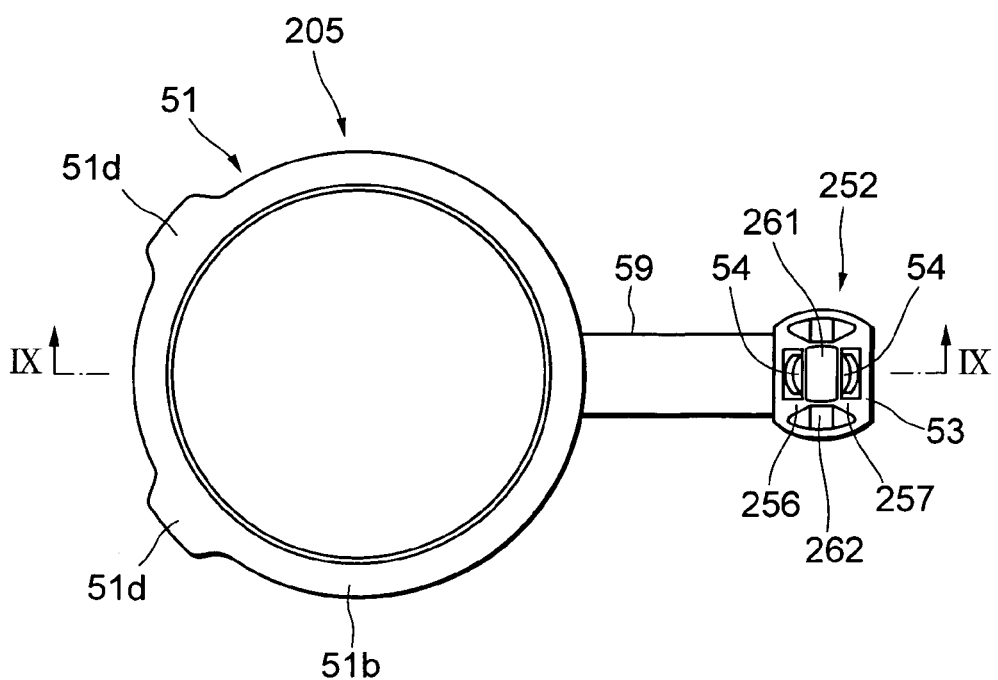

TELESCOPE AND LENS CAP

The disclosure of the following priority application is herein incorporated by reference:
Japanese Patent Application No. 2006-031066 filed on Feb. 8, 2006.

BACKGROUND OF THE INVENTION

1. Field of the Invention

The present invention relates to a telescope equipped with a lens cap, and to a lens cap.

2. Related Background Art

There has been known a pair of binoculars equipped with a couple of lens barrels and a couple of lens caps (see paragraphs 0009 through 0013 and FIG. 1 of Japanese Patent Application Laid-Open No. 2000-147388).

A couple of lens barrels are connected with each other by a body (a bridge).

The lens cap has a cap body with a circular shape and a couple of extendable elastic portions.

The lens barrel and the lens cap are connected by a couple of connecting members. Each of the connecting member is composed of a rotation axis disposed in a state protruding from the lens barrel surface and a hole formed on the elastic portion of the lens cap.

The couple of rotation axes are respectively located upper and lower outer surfaces on the tip portion of the lens barrel upon operating the binoculars. Each tip of the rotation axes is formed with a flared portion with an "L" shape.

The lens barrel and the lens cap are connected each other by inserting the rotation axes into the holes of the couple of elastic member.

In a telescope, for example, a pair of binoculars, according to the prior art, there has been a problem that since a couple of rotation axes are disposed on the outer surface of the lens barrel, the rotation axes become conspicuous when the connecting members of the lens cap are removed from the rotation axes. Accordingly, smoothness of the curved surface formed from the objective lens portion to the eyepiece portion is lost, so that aesthetic external appearance of the binocular has been spoiled.

SUMMARY OF THE INVENTION

The present invention is made in view of the aforementioned problems and has an object to provide a telescope capable of preventing the aesthetic external appearance thereof from losing.

According to a first aspect of the present invention, there is provided a telescope capable of being equipped with a lens cap at a tip of a lens barrel comprising: the lens barrel on which a hole is formed; and the lens cap including a lens cap body, an extending portion extending from the lens cap body, and a connecting member that is disposed at a tip of the extending portion and removably attached to the hole.

In the first aspect of the present invention, it is preferable that the connecting member is connected to the hole by pressing an inner surface of the hole.

In the first aspect of the present invention, it is preferable that the hole has a first concave portion or a first projecting portion at inner part of the hole, the connecting member has a second concave portion or a second projecting portion that connects with the first projecting portion or the first concave portion, respectively, and at least one of the inner part of the hole and the connecting member is made of an elastic material.

In the first aspect of the present invention, it is preferable that the hole has a small diameter portion and a large diameter portion that is disposed at bottom side of the small diameter portion, and the connecting member has a plurality of leg portions that are put into the small diameter portion, a nail portion that is disposed at a tip end of at least one leg portion of the plurality of leg portions and meshed with the large diameter portion, and an elastic holder capable of holding the plurality of leg portions in a radial direction such that the leg portions can be opened and closed.

In the first aspect of the present invention, it is preferable that the hole is a circular hole.

In the first aspect of the present invention, it is preferable that the elastic holder has a lock portion that keeps a locking state between the large diameter portion and the nail portion.

In the first aspect of the present invention, it is preferable that the lock portion is disposed inside of the plurality of leg portions and capable of being slid in a direction that the leg portions are put on and taken out.

According to a second aspect of the present invention, there is provided a lens cap comprising: a lens cap body that is capable of removably attaching to a tip of a lens barrel of a telescope; an extending portion extending from the lens cap body; and a connecting member that is removably attaching to a hole that is disposed on an outer surface of the lens barrel and has a small diameter portion and a large diameter portion locating at bottom side of the small diameter portion; the connecting member having a plurality of leg portions that are put into the small diameter portion, a nail portion that is disposed at a tip end of at least one leg portion of the plurality of leg portions and meshed with the large diameter portion, and an elastic holder capable of holding the plurality of leg portions in a radial direction such that the leg portions can be closed.

In the second aspect of the present invention, it is preferable that the elastic holder has a lock portion that keeps a locking state between the large diameter portion and the nail portion.

In the second aspect of the present invention, it is preferable that at least one leg portion of the plurality of leg portions has a tapered shape on the other leg portion side.

Other features and advantages according to the present invention will be readily understood from the detailed description of the preferred embodiments in conjunction with the accompanying drawings.

BRIEF DESCRIPTION OF THE DRAWINGS

FIG. 7 is a bottom plan view of a connecting portion of the lens cap shown in FIG. 4.

FIG. 8 is a plan view showing a lens cap of a pair of binoculars according to a second embodiment the present invention.

DESCRIPTION OF THE MOST PREFERRED EMBODIMENT

Embodiments according to the present invention are explained below with reference to accompanying drawings.

First Embodiment

Figure 1:
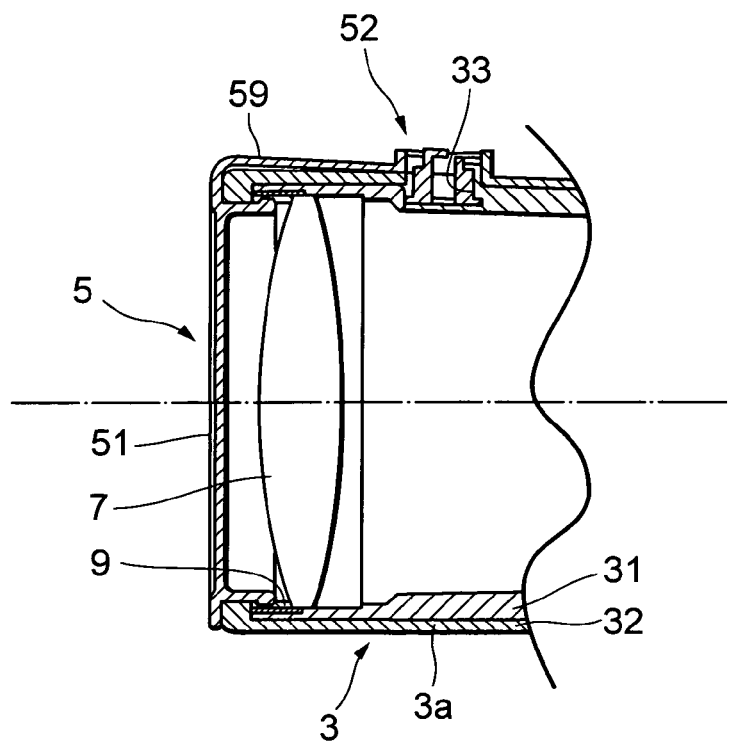
FIG. 1 is a sectional view showing a portion of a lens barrel of a pair of binoculars and a lens cap according to a first embodiment of the present invention.
Figure 2:
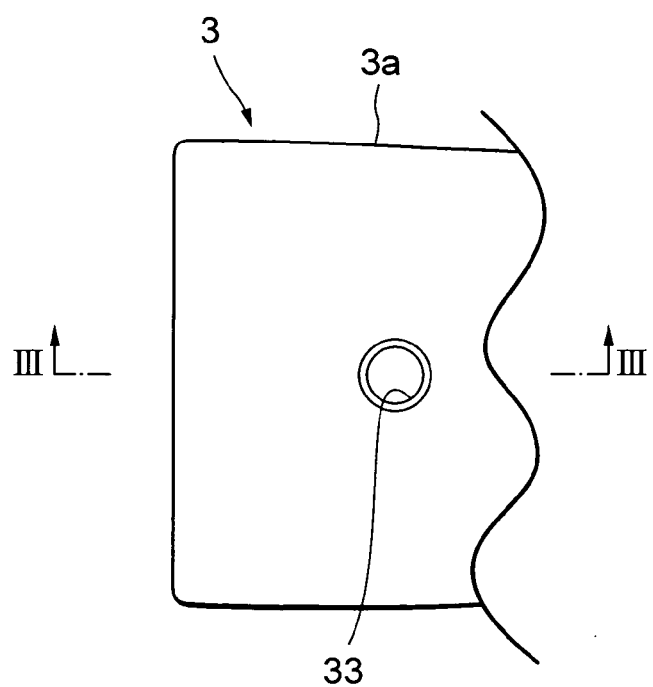
FIG. 2 is a plan view of the lens barrel shown in FIG. 1.
Figure 3:
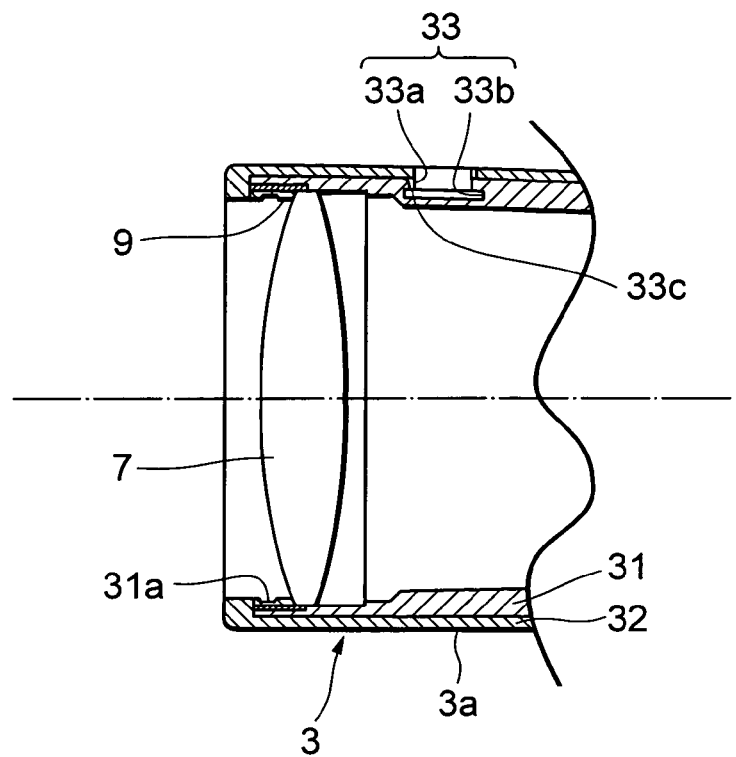
FIG. 3 is a sectional view along a III-III line shown in FIG. 2.
Figure 4:
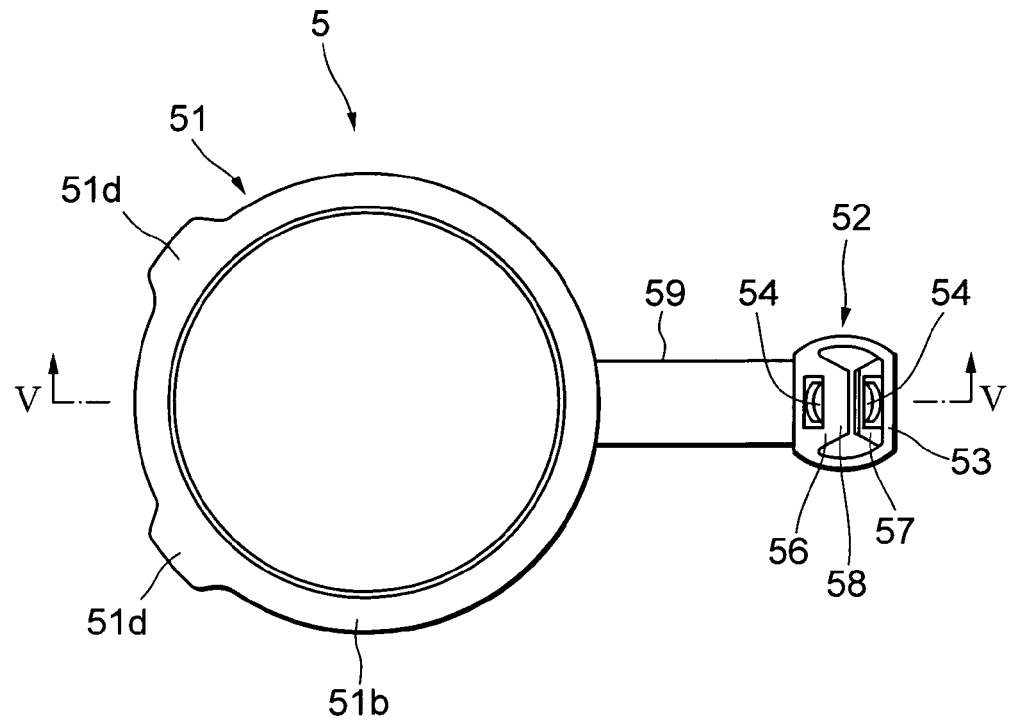
FIG. 4 is a plan view of the lens cap shown in FIG. 1.
Figure 5:
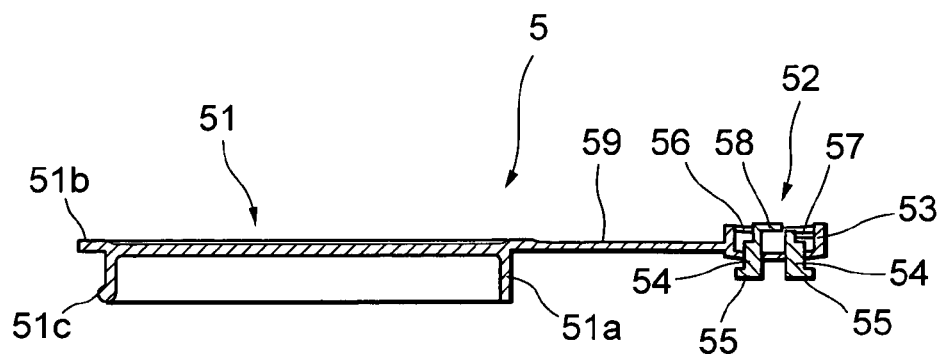
FIG. 5 is a sectional view along a V-V line in FIG. 4.
Figure 6:
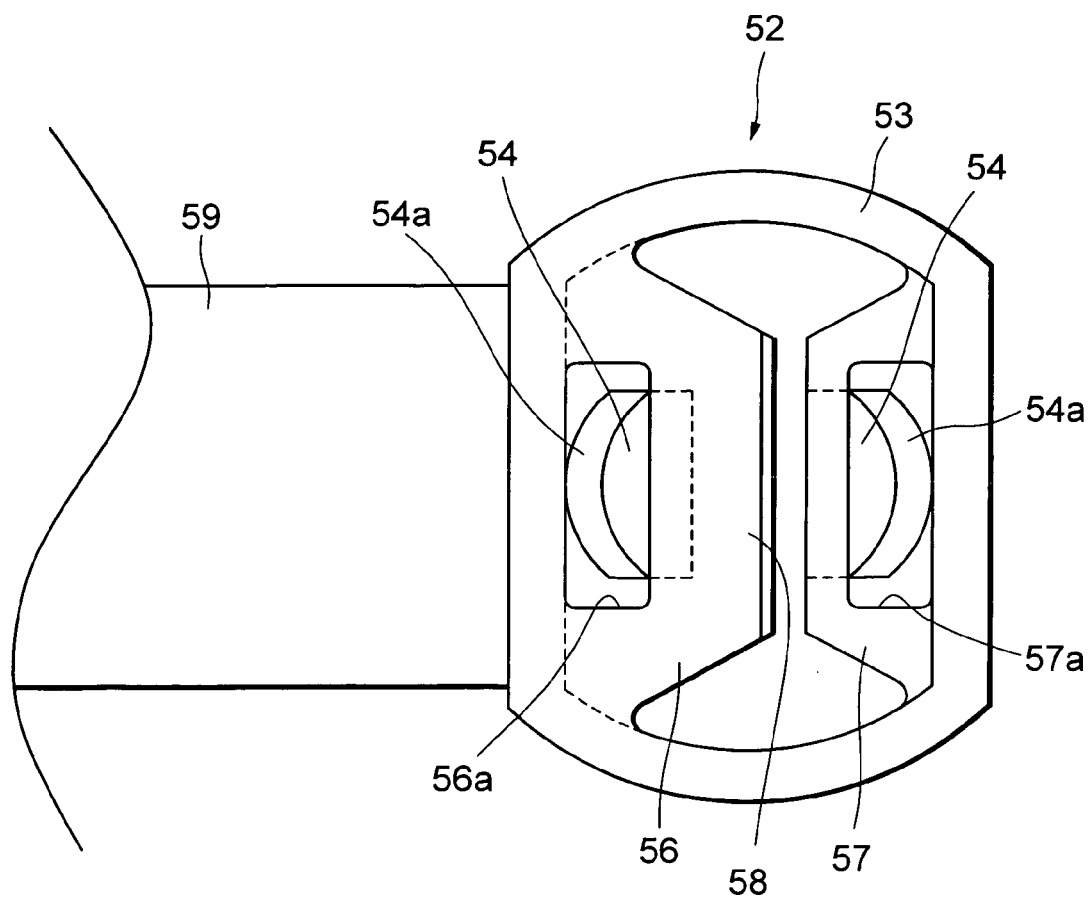
FIG. 6 is a plan view of a connecting portion of the lens cap shown in FIG. 4.

FIG. 1 is a sectional view showing a portion of a lens barrel of a pair of binoculars and a lens cap according to a first embodiment of the present invention. FIG. 2 is a plan view of the lens barrel shown in FIG. 1. FIG. 3 is a sectional view along a III-III line shown in FIG. 2. FIG. 4 is a plan view of the lens cap shown in FIG. 1. FIG. 5 is a sectional view along a V-V line in FIG. 4. FIG. 6 is a plan view of a connecting portion of the lens cap shown in FIG. 4. FIG. 7 is a bottom plan view of a connecting portion of the lens cap shown in FIG. 4.

As shown in FIG. 1, the pair of binoculars (telescope) has a couple of lens barrels 3 (only one lens barrel 3 is shown), and a couple of lens caps 5 (only one lens cap 5 is shown).

As shown in FIGS. 2 and 3, the lens barrel 3 has an objective portion 3a and an eyepiece portion (not shown). The lens barrel is a housing that accommodates optical elements. The lens barrel 3 is composed of a lens barrel body 31 and a cover 32. A female screw 31a is formed at light incident side end on an inner periphery of the lens barrel body 31. As for the material of the lens barrel body 31, there is recommended such as a polycarbonate. The cover 32 covers up the lens barrel body 31. As for the material of the cover 32, there is recommended such as an elastomer.

A hole 33 is formed through the outer surface of the lens barrel 3. The hole 33 is a circular hole, and is composed of a small diameter portion 33a and a large diameter portion 33b. The small diameter portion 33a is located at an opening side to open radially outwardly, and the large diameter portion 33b is located at a bottom side (inner side of the lens barrel 3). A step surface 33c is formed between the small diameter portion 33a and the large diameter portion 33b.

An objective lens 7 is stored at light incident side end of the lens barrel 3. The objective lens 7 is fixed by a fixing ring 9 screwed in the female screw 31a.

As shown in FIGS. 4 through 7, the lens cap 5 includes a lens cap body 51, an extending portion 59, and a connecting member 52. As for the material of the lens cap 5, there is recommended such as a synthetic rubber.

The lens cap body 51 has a cylindrical portion 51a and a brim portion 51b. The cylindrical portion 51a is inserted into the light incident side end portion of the lens barrel 3. A projection portion 51c having an arc shape with a semicircular cross section is formed at the opening edge of the cylindrical portion 51a in a circumferential direction at regular intervals (see FIG. 5). The brim portion 51b protrudes in the radial outward direction from the bottom part of the cylindrical portion 51a. When the cylindrical portion 51a is inserted into the light incident side end portion of the lens barrel 3, the brim portion 51b abuts a light incident side end surface of the lens barrel 3. There are two tabs 51d formed on the brim portion 51b (see FIG. 4).

The connecting member 52 has a ring shape portion (elastically holding portion) 53 and a couple of leg portions 54, 54, and a couple of nail portions 55, 55.

The ring shape portion 53 approximately has an elliptical shape.

The leg portion 54 roughly has a half cylinder shape with a step surface 54a (see FIG. 6). A leg portion 54 of the couple of lens portions 54, 54 is connected to the ring shape portion 53 by a connecting piece 56. A plane surface of the connecting piece 56 roughly has a trapezoid. The connecting piece 56 has a window 56a. A free end of the connecting piece 56 is connected to a tab 58. An upper surface of the connecting piece 56 and an upper surface of the tab 58 are flush with an upper surface of the ring shape portion 53.

The other leg portion 54 of the couple of leg portions 54, 54 is connected to the ring shape portion 53 by a connecting piece 57. A plane surface of the connecting piece 57 roughly has a trapezoid. The connecting piece 57 has a window 57a. The connecting piece 57 and the connecting piece 56 have a positional relation non-symmetric with respect to a center axis of the ring shape portion 53 with each other. The circumferences of both of the leg portions 54, 54 are on a virtual circle whose diameter is slightly smaller than the inner diameter of the small diameter portion 33a.

The couple of leg portions 54, 54 are elastically held by the ring shape portion 53 with a given interval.

The couple of nail portions 55, 55 are connected to the lower portions of respective leg portions 54, 54. Each of the nail portions 55, 55 roughly has a semicircular shape. The outer circumference of both of the leg portions 54, 54 are on a virtual circle whose diameter is larger than the inner diameter of the small diameter portion 33a and slightly smaller than that of the large diameter portion 33b.

The extending portion 59 is extending from the lens cap body 51 and is connected to the connecting member 52 with tip end thereof.

In order to connect the connecting member 52 of the lens cap body 51 to the lens barrel 3, at first, the ring shape portion 53 is held by your fingers (not shown) and squeezed to shorten the distance between the nail portions 55, 55.

With this state, the nail portions 55, 55 and the leg portions 54, 54 are put into the hole 33 of the lens barrel 3.

When the nail portions 55, 55 and the leg portions 54, 54 are put into the hole 33 of the lens barrel 3, release your fingers from the ring shape portion 53.

Upon releasing the ring shape portion 53, the ring shape portion 53 returns to the original shape with its elastic force. Then, the nail portions 55, 55 become engaged to the step surface 33c, so that they will not come out from the hole 33. Since the hole 33 is a circular hole, the connecting portion 52 can be rotated around the leg portions 54, 54 as the center of rotation.

In order to put the lens cap 51 into the lens barrel 3, the cylindrical portion 51a of the lens cap body 51 may be inserted into the light incident side end portion of the lens barrel 3. When the cylindrical portion 51a is inserted into the lens barrel 3 by a given amount, since the brim portion 51b of the lens cap body 51 abuts a light incident side end surface of the lens barrel 3, the cylindrical portion 51a may not be inserted anymore. Upon inserting the cylindrical portion 51a into the lens barrel 3, the projection portion 51c is caught by the inner circumference of the lens barrel 3, so that the lens cap body 51 does not easily come out from the lens barrel 3.

In order to remove the lens cap body 51 from the lens barrel 3, the lens cap body 51 may be removed from the lens barrel 3 by holding the tab 51d of the lens cap body 51.

In order to remove the connecting member 52 of the lens cap 5 from the lens barrel 3, hold the ring shape portion 53 by your fingers, squeeze it to shorten the distance between the nail portions 55, 55, and lift the connecting member 52.

In the first embodiment, since only a hole 33 is disposed on the lens barrel 3 as a connecting means, it becomes possible to prevent aesthetic external appearance from being spoiled.

Since the hole 33 is a circular hole, the connecting portion 52 can be rotated around the leg portions 54, 54 as the center of rotation. Accordingly, when outer force is applied to the lens cap body 51 or the extending portion 59, the connecting portion 52 is just rotated, so that it is scarcely happen that the connecting portion 52 comes out from the lens barrel 3.

Moreover, since tabs 51d are disposed on the lens cap body 51, the lens cap body 51 can easily be removed from the lens barrel 3.

Second Embodiment

Figure 9:
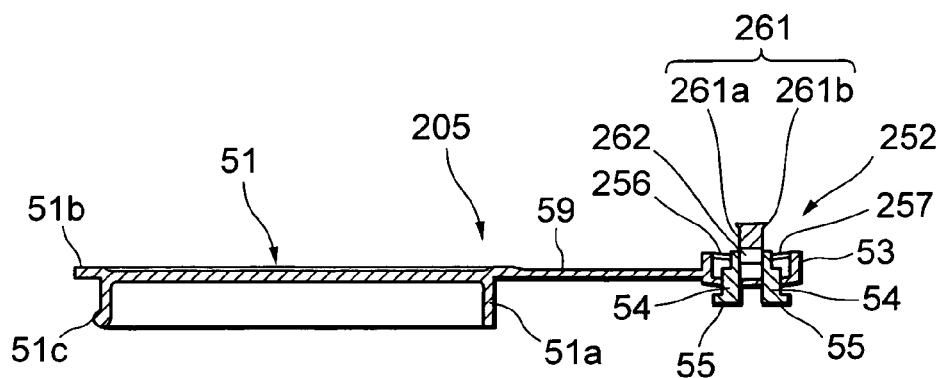
FIG. 9 is a sectional view along a IX-IX line in FIG. 8.
Figure 10:
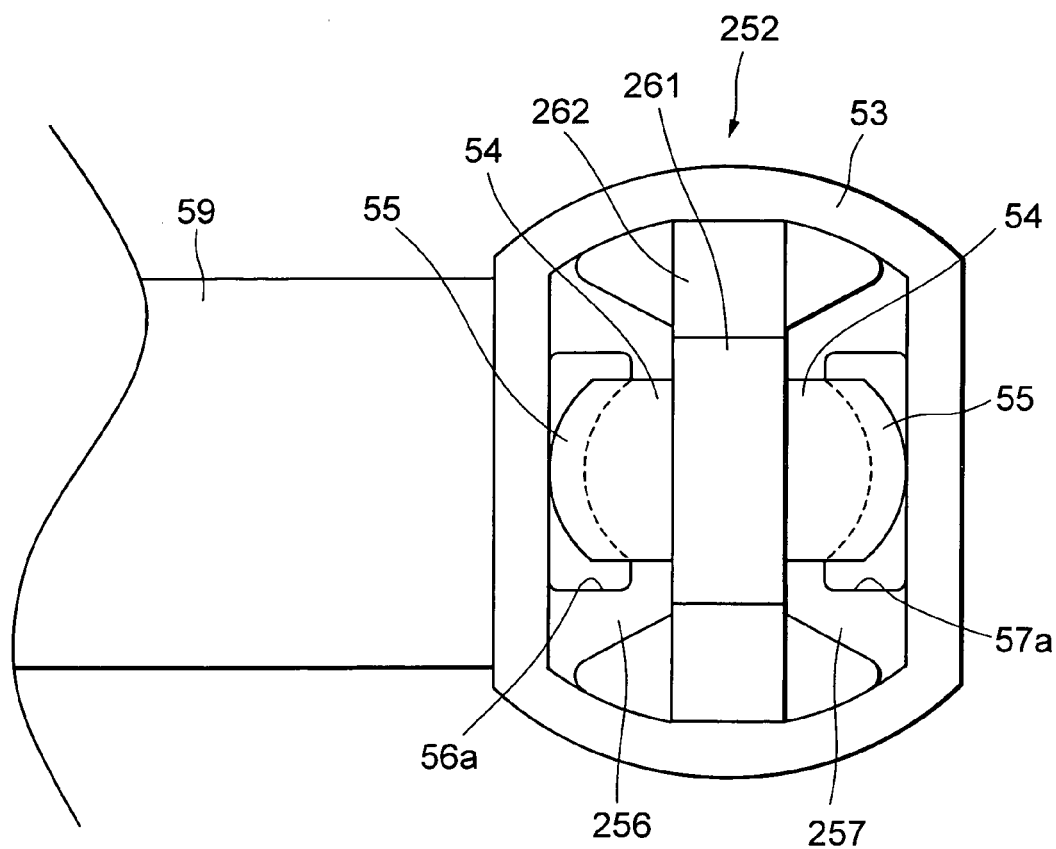
FIG. 10 is a bottom plan view of a connecting portion of the lens cap shown in FIG. 8.
Figure 11:
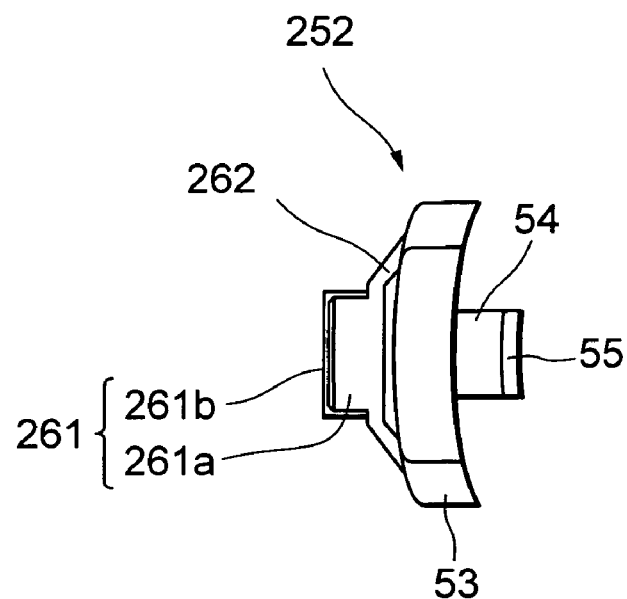
FIG. 11 is a side view of the connecting portion of the lens cap shown in FIG. 8.

FIG. 8 is a plan view showing a lens cap of a pair of binoculars according to a second embodiment the present invention. FIG. 9 is a sectional view along a IX-IX line in FIG. 8. FIG. 10 is a bottom plan view of a connecting portion of the lens cap shown in FIG. 8. FIG. 11 is a side view of the connecting portion of the lens cap shown in FIG. 8.

In the second embodiment, an element commonly used in the first embodiment is attached the same reference symbol, and duplicated explanations are omitted. The different portions are mainly explained below.

As shown in FIGS. 8 through 11, only the configuration of a connecting member 252 of the lens cap 205 is different from that of the first embodiment.

Upper surfaces of connecting pieces 256, and 257 are flush with the upper surface of the ring shape portion 53. The connecting pieces 256 and 257 are the same shape, and neither of them are formed with any tab like the tab 58 in the first embodiment.

The connecting member 252 has a lock portion 261. The lock portion 261 includes a lock body 261a and a knob 261b. The lock body 261a is capable of being put in and taken out between a couple of leg portions 54, 54. Since a cross-section of the knob 261b has a size larger than that of the lock body 261a, the knob 261b cannot be put in the space between the leg portions 54, 54.

The lock portion 261 is connected to the ring shape portion 53 through a bridge portion 262 bridging over the ring shape portion 53. The bridge portion 262 has elasticity. When the bridge portion 262 is located outside of the ring shape portion 53 (not surrounded by the ring shape portion 53), elastic force of the bridge portion 262 affects the bridge portion 262 not to be put in the ring shape portion 53. However, when the bridge portion 262 is forced to be put in the ring shape portion 53 against the elastic force, the bridge portion 262 is reversed and the elastic force of the bridge portion 262 affects the bridge portion 262 not to be taken out from the ring shape portion 53.

In the second embodiment, the connecting state between the connecting member 252 and the lens barrel 3 can be locked.

In order to lock the connecting state between the connecting member 252 and the lens barrel 3, from a state shown in FIG. 11 (assuming that the leg portions 54, 54 and the nail portions 55, 55 are put in the hole 33), it is sufficient that the lock portion 261 is put in the space between a couple of leg portions 54, 54 against the elastic force of the bridge portion 262.

In this case, since a cross-section of the knob 261b has a size larger than that of the lock body 261a, the knob 261b is not put in the space between the leg portions 54, 54. Accordingly, upon releasing the lock state, the knob 261b can firmly be held.

When the connecting state is locked, the elastic force of the bridge portion 262 affects the lock portion 261 toward bottom of the hole 33 and the leg portions 54, 54 are pressed to the inner wall of the hole 33, so that the lock state is difficult to be inadvertently released.

In order to release the lock state, it is sufficient to take out the lock portion 261 from the space between the leg portions 54, 54 by holding the knob 261b. Accordingly, the pressure on the inner surface of the hole 33 from the leg portions 54, 54 is released.

As described above, in the second embodiment, the connecting state between the connecting member 252 and the lens barrel 3 can be locked as well as the same effect as the first embodiment can be obtained.

Although both of the first and second embodiments disclose a pair of binoculars, the invention is not limited to binoculars and suitably applied to a telescope with a single lens barrel.

Although the lens caps 5 and 205 according to the first and second embodiments are used for the objective lenses 3a, the lens caps can be used for eyepiece portions.

In the first embodiment, although the hole 33 is a circular hole, the hole 33 is not limited to a circular hole, and may be a rectangular hole.

In the first embodiment, although the hole 33 has a small diameter portion 33a and a large diameter portion 33b, instead of the hole 33, a hole with a uniform inner diameter or a hole having a small diameter portion, a middle diameter portion, and a large diameter portion are also possible.

In the first and second embodiments, although there are two leg portions 54, 54, it is possible that there are at least two leg portions.

In the first and second embodiments, although the nail portion 55 is disposed on each leg portion 54, it is not necessary to dispose the nail portion 55 to each leg portion 54, and it is sufficient that the nail portion is disposed to at least one leg portion among at least two leg portions.

In the first and second embodiments, although it is constructed such that the connecting members 52, 252 are not easily come out from the lens barrel 3 by the nail portions 55, 55, the construction of the connecting member is not limited to this. For example, it is possible that the connecting member is made of an elastic member formed like a cork plug, and the connecting member is pressed into a hole formed on the outer wall of the lens barrel. In this case, the hole may be a simple hole with a uniform inner diameter.

In the second embodiment, although it is constructed such that the connecting state between the connecting member 252 and the lens barrel 3 is locked by putting the lock portion 261 into the space between the leg portions 54, 54, the lock mechanism is not limited to this. For example, it is possible that the lock portion is connected to the ring shape portion to prevent the ring shape portion from being deformed resulting in stopping the movement of the leg portions 54, 54.

VARIATION 1

Figure 12:
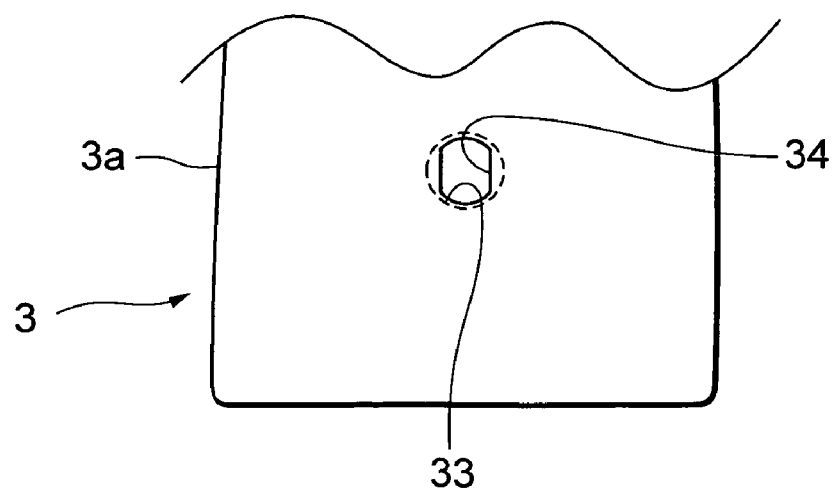
FIG. 12 is a plan view showing a portion of a lens barrel of a pair of binoculars according to Variation 1 of the present invention.

FIG. 12 is a plan view showing a portion of a lens barrel of a pair of binoculars according to Variation 1 of the present invention.

As shown in FIG. 12, a couple of flat portions 34 are disposed in the hole 33 that is formed on the lens barrel 3. The couple of flat portions 34 which are opposed to each other when the hole 33 is viewed from an opening side are formed at the opening.

Upon viewing the hole 33 from inside, the inner part of the hole 33 has a circular shape. In other words, the radially outer end of the hole 33 is a couple of flat portions 34, and the inside of the hole is circular. The nail portions 55 of the connecting member 52 form a couple of nails facing with each other as shown in FIG. 10.

With constructing the hole having a shape like this, the following effect can be expected. When the connecting member 52 (not shown in FIG. 12) is put into the hole 33, since the inner part of the hole 33 has a circular shape, the connecting member can be rotated in the hole 33. However, since the couple of flat portions 34 facing with each other are formed at the radially outer end of the hole 33, a portion of the connecting member is prevented from moving outward from the opening. Accordingly, connecting member 52 becomes difficult to be inadvertently come off from the hole 33.

VARIATION 2

Figure 13:
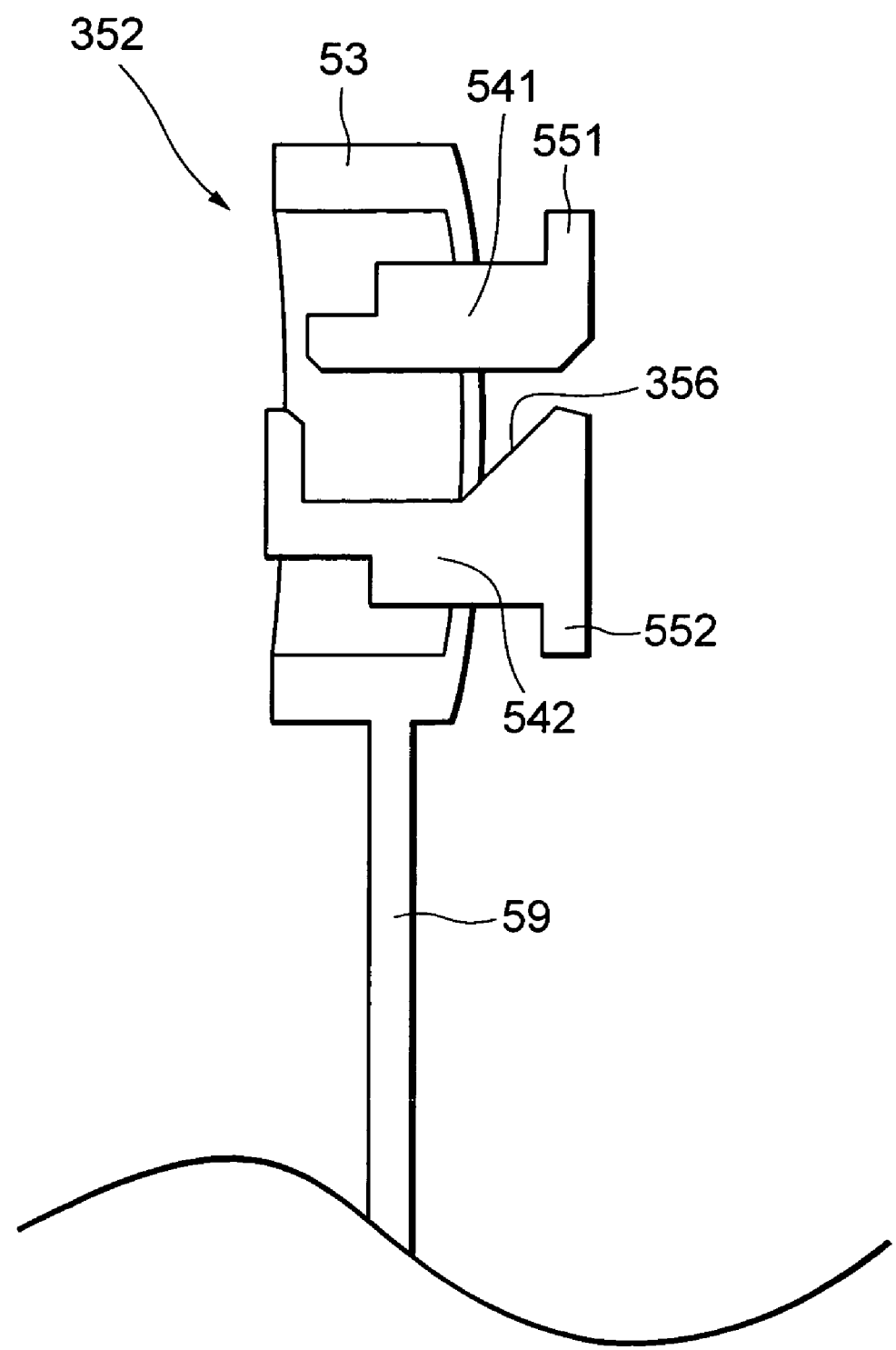
FIG. 13 is a partial sectional view showing a construction of a connecting member of a lens cap for a pair of binoculars according to Variation 2 of the present invention.

FIG. 13 is a partial sectional view showing a construction of a connecting member of a lens cap for a pair of binoculars according to Variation 2 of the present invention.

The connecting member 352 includes a ring shape portion 53, a couple of leg portions 541, 542 disposed substantially at the center of the ring portion 53, and a couple of nail portions 551, 552, which are disposed at tip portions of respective leg portions 541, 542. Between the leg portion 542 and the nail portion 552, there is disposed a tapered portion 356 facing the other leg portion 541. The tapered portion 356 is formed on the side facing the other leg portion 541. Inclination of the tapered portion 356 is such that the distance between the leg portion 542 and the other leg portion 541 becomes large as the distance from the tip end becomes large.

Upon comparing the leg portion 541 with the leg portion 542, the leg portion 542 on which the tapered portion 356 is formed is thicker than the leg portion 541, so that the amount of bend becomes less. On the other hand, the other leg portion 541 on which the tapered portion is not formed is constructed such that the thickness of the leg portion 541 or the nail portion 551 is thinner than that of the leg portion 542 or the nail portion 551 so as to be easily bent.

These configurations are quite effective upon putting or taking out the connecting member 352 into/from the hole of the lens barrel.

At first, the case that the connecting member 352 is put into the hole of the lens barrel is explained. Firstly, the nail portion 551 is put into the hole of the lens barrel. When the nail portion 551 is put into the hole, the leg portion 541 is bent, and the nail portion 551 is bent toward the nail portion 552. Since the diameter of the hole is smaller than the distance between the tips of both nail portions, by bending the nail portion 551 toward the nail portion 552 the distance between the tips becomes small, so that it becomes easier to put the connecting member into the hole. At this time, by bending the leg portion 541, the other nail portion 552 side of the nail portion 551 moves along the tapered portion 356. Accordingly, smooth bending of the leg portion 541 can be realized. In this case, since the leg portion 542 is thick, the leg portion 542 is scarcely bent upon putting on the nail portion 551 into the hole, so that the nail portion 552 hardly moves outwardly (in the opposite direction of the nail portion 551). Accordingly, when the nail portion 552 is put into the hole after putting the nail portion 551 into the hole, it becomes easier to position the nail portion 552 to the hole.

After putting both of the nail portions into the hole, since both of the nail portions become an open state shown in FIG. 13, the connecting member does not come off from the hole.

The case when the connecting member is to be removed from the hole is explained.

At first, while grasping an extending portion 59, you push a side portion of the ring shape portion 53 with the nail of your thumb. Then, the leg portion 541 that has the nail portion 551 and is liable to be bent is tilted along the tapered portion 356 toward the leg portion 552. Accordingly, a distance between both of the legs becomes small, so that the nail portion 551 initially comes off from the hole. On this occasion, because of the thickness, the leg portion 542 of the nail portion 552 is hard to be bent. Accordingly, upon removing the nail portion 551 from the hole, the leg portion 541 comes in contact with the inner wall of the hole, so that the leg portion 541 is easy to be removed from the hole using the leg portion 542 as a support. Next, the nail portion 552 is to be removed from the hole, since the nail portion 551 has been removed from the hole, the nail portion 552 is easy to be removed from the hole.

In this manner, it is effective that the connecting member shown in FIG. 13 has a tapered portion on one of the two leg portions. It is further effective that the thickness of the one leg portion on which the tapered portion is formed is thicker than that of the other leg portion on which the tapered portion is not formed.

VARIATION 3

Figure 14:
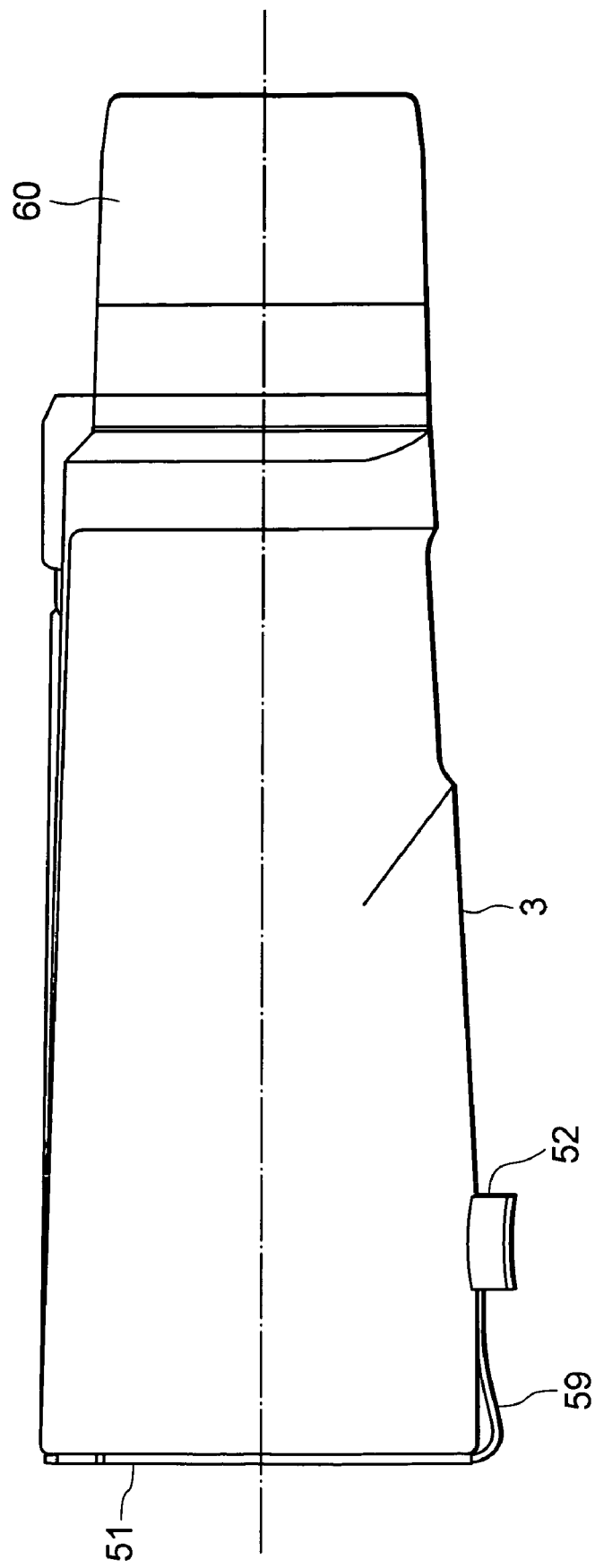
FIG. 14 is a side view showing a state that a connecting member of a lens cap is connected to each lens barrel of a pair of binoculars according to Variation 3 of the present invention.

FIG. 14 is a side view showing a state that a connecting member of a lens cap is connected to each lens barrel of a pair of binoculars according to Variation 3 of the present invention.

The connecting member 52 is connected to the lower portion of each lens barrel of the pair of binoculars.

Through an extending portion 59, the lens cap body 51 is connected to the connecting member 52 that is connected to the lower portion of each lens barrel of the pair of binoculars. When the lens cap body 51 is removed from the objective portion, the lens cap body 51 is suspended under the binoculars. Accordingly, upon removing the lens cap body 51 from the objective portion, the lens cap body 51 does not cover the objective portion, so that the lens cap body 51 does not become an obstacle upon observation.

However, the connecting member 52 may be connected to the upper portion of each lens barrel of the binoculars. In this case, when the lens cap body 51 hangs over the front portion of the objective portion upon removing the lens cap body 51 from the objective portion, the position of the lens cap body 51 can be moved by rotating the connecting member.

Moreover, when the connecting member 52 is connected to the lens barrel 3 in a manner that the connecting member 52 projects from the lens barrel 3, even if the binoculars are put on a desk or the like, the lens barrel can be protected by the connecting member 52 such that the connecting member 52 becomes a holding member of the binoculars to prevent the lens barrel 3 from directly contacting the desk or the like.

As described above, the present invention makes it possible to provide a telescope capable of preventing the aesthetic external appearance thereof from losing upon removing a lens cap from the binoculars.

Additional advantages and modifications will readily occur to those skilled in the art. Therefore, the invention in its broader aspect is not limited to the specific details, and representative devices shown and described herein. Accordingly, various modifications may be made without departing from the spirit or scope of the general inventive concept as defined by the appended claims and their equivalents.

What is claimed is:

1. A telescope comprising a lens barrel, which is a housing accommodating optical elements, and a lens cap configured to be attached to a tip of the lens barrel,
    wherein a hole is formed in a portion of an outer peripheral side surface of the lens barrel,
    the lens cap includes a lens cap body which has a projecting portion configured to be fitted in an inner circumference of the tip of the lens barrel, an extending portion extending from the lens cap body, and a connecting member that is disposed at a tip of the extending portion and is configured to be put into the hole and removably connected therein.

2. The telescope according to claim 1, wherein the connecting member is connected to the hole by pressing an inner surface of the hole.

3. The telescope according to claim 1, wherein the hole has a first concave portion or a first projecting portion at inner part of the hole, wherein the connecting member has a second concave portion or a second projecting portion that connects with the first projecting portion or the first concave portion, respectively, and wherein at least one of the inner part of the hole and the connecting member is made of an elastic material.

4. The telescope according to claim 1, wherein the hole has a small diameter portion and a large diameter portion that is disposed at bottom side of the small diameter portion, and wherein the connecting member has a plurality of leg portions that are put into the small diameter portion, a nail portion that is disposed at a tip end of at least one leg portion of the plurality of leg portions and meshed with the large diameter portion, and an elastic holder capable of holding the plurality of leg portions in a radial direction such that the leg portions can be closed.

5. The telescope according to claim 3, wherein the hole is a circular hole.

6. The telescope according to claim 4, wherein the elastic holder has a lock portion that keeps a locking state between the large diameter portion and the nail portion.

7. The telescope according to claim 6, wherein the lock portion is disposed inside of the plurality of leg portions and capable of being slid in a direction that the leg portions are put on and taken out.

8. A lens cap comprising:
    a lens cap body that is capable of removably attaching to a tip of a lens barrel of a telescope;
    an extending portion extending from the lens cap body; and
    a connecting member that is removably attaching to a hole that is disposed on an outer surface of the lens barrel and has a small diameter portion and a large diameter portion locating at bottom side of the small diameter portion;
    the connecting member having a plurality of leg portions that are put into the small diameter portion, a nail portion that is disposed at a tip end of at least one leg portion of the plurality of leg portions and meshed with the large diameter portion, and an elastic holder capable of holding the plurality of leg portions in a radial direction such that the leg portions can be closed.

9. The lens cap according to claim 8, wherein the elastic holder has a lock portion that keeps a locking state between the large diameter portion and the nail portion.

10. The lens cap according to claim 8, wherein at least one leg portion of the plurality of leg portions has a tapered shape on the other leg portion side.

* * * * *